(12) United States Patent
Joseph et al.

(10) Patent No.: US 10,949,702 B2
(45) Date of Patent: Mar. 16, 2021

(54) SYSTEM AND A METHOD FOR SEMANTIC LEVEL IMAGE RETRIEVAL

(71) Applicant: Cognizant Technology Solutions India Pvt. Ltd., Chennai (IN)

(72) Inventors: Rajkumar Joseph, Chennai (IN); Venugopal Gundimeda, Hyderabad (IN); Jerubbaal John Luke, Nazareth (IN); Mahesh Balaji, Chennai (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 179 days.

(21) Appl. No.: 16/440,136

(22) Filed: Jun. 13, 2019

(65) Prior Publication Data

US 2020/0334486 A1 Oct. 22, 2020

(30) Foreign Application Priority Data

Apr. 16, 2019 (IN) .............................. 201941015182

(51) Int. Cl.
*G06K 9/00* (2006.01)
*G06K 9/46* (2006.01)
*G06F 16/535* (2019.01)
*G06N 3/08* (2006.01)
*G06T 5/20* (2006.01)
*G06T 5/00* (2006.01)

(52) U.S. Cl.
CPC ......... *G06K 9/4623* (2013.01); *G06F 16/535* (2019.01); *G06N 3/08* (2013.01); *G06T 5/002* (2013.01); *G06T 5/20* (2013.01)

(58) Field of Classification Search
None
See application file for complete search history.

(56) References Cited

U.S. PATENT DOCUMENTS

| | | | |
|---|---|---|---|
| 6,751,343 B1 * | 6/2004 | Ferrell | G06F 16/5838 382/145 |
| 7,023,441 B2 | 4/2006 | Choi | |
| 9,519,842 B2 | 12/2016 | Mochizuki | |
| 9,661,299 B2 | 5/2017 | Stauder | |
| 9,691,141 B2 | 6/2017 | Shin | |
| 2004/0022451 A1 | 2/2004 | Fujimoto | |

(Continued)

*Primary Examiner* — Atiba O Fitzpatrick
(74) *Attorney, Agent, or Firm* — Cantor Colburn LLP

(57) ABSTRACT

A system and method for retrieval of similar images related to query images is provided. The query images are pre-processed for noise removal by selecting filtering technique based on noise variance estimation in each query image with respect to pre-set noise variance threshold value. The pre-processed query images are pre-classified for determining class one image identifier. Image types are generated from pre-processed query images for determining class two image identifier. Features are extracted from pre-classified query images based on class one image identifier and from generated images based on class two image identifier. The images similar to query images are retrieved which have features similar to extracted features of pre-classified query images and generated images. The retrieved similar images are ranked for determining most similar images with respect to query images. Similarity between query images and retrieved similar images is analyzed for re-ranking retrieved similar images.

29 Claims, 5 Drawing Sheets

(56) References Cited

U.S. PATENT DOCUMENTS

| | | |
|---|---|---|
| 2007/0071440 A1 | 3/2007 | Kagaya |
| 2008/0037877 A1* | 2/2008 | Jia .................. G06F 16/583 382/224 |
| 2010/0153449 A1* | 6/2010 | Baba ................ G06F 16/583 707/780 |
| 2015/0016729 A1* | 1/2015 | Cevahir .............. G06K 9/46 382/195 |
| 2018/0012110 A1 | 1/2018 | Souche |
| 2018/0204354 A1 | 7/2018 | Kimura |

* cited by examiner

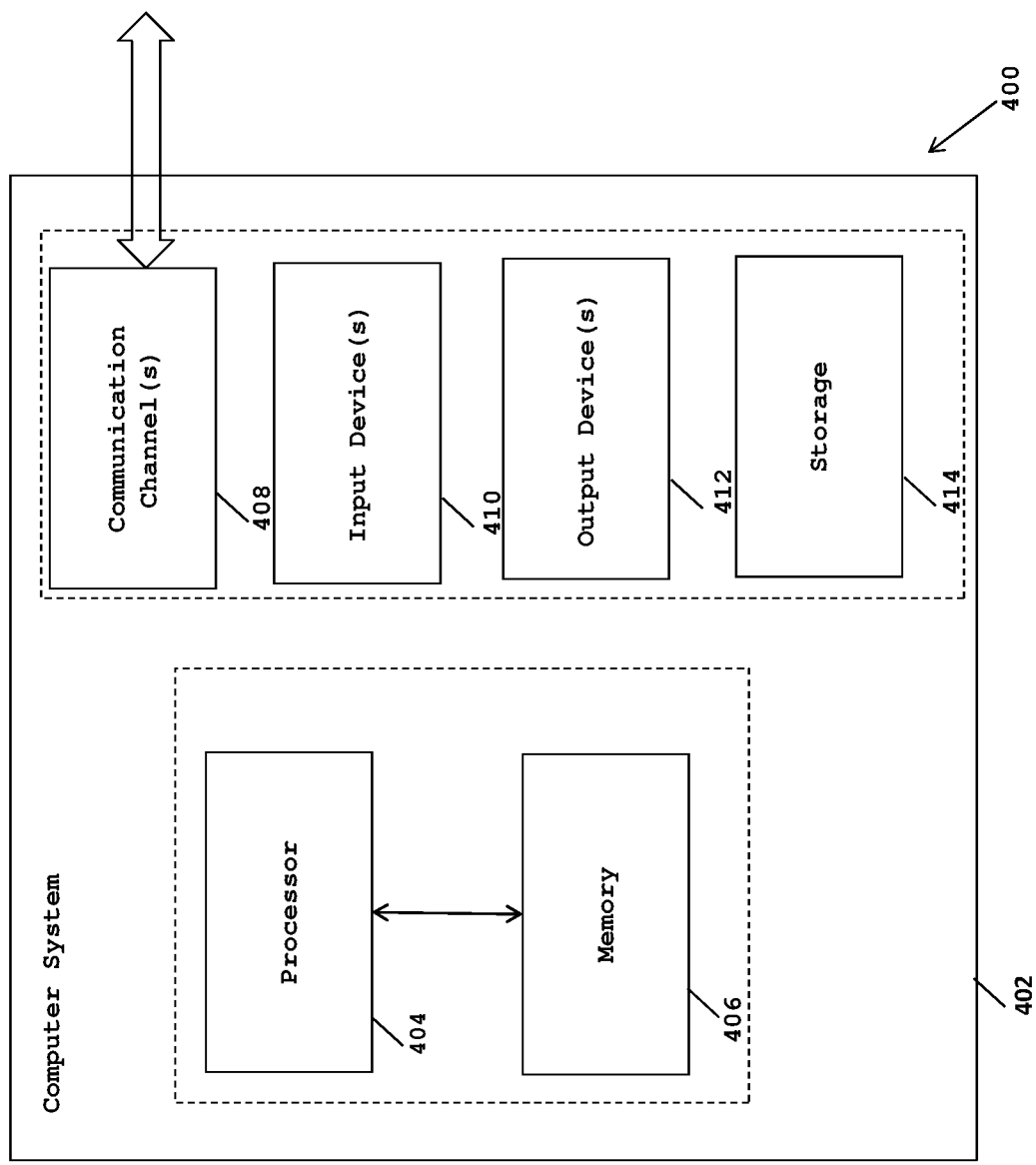

SYSTEM AND A METHOD FOR SEMANTIC LEVEL IMAGE RETRIEVAL

CROSS REFERENCE TO RELATED APPLICATION

This application is related to and claims the benefit of Indian Patent Application Number 201941015182 filed on Apr. 16, 2019, the contents of which are herein incorporated by reference in their entirety.

FIELD OF THE INVENTION

The present invention relates generally to the field of image processing and retrieval and, more particularly, the present invention relates to a system and a method for semantic level image retrieval.

BACKGROUND OF THE INVENTION

Image retrieval is a process of searching or extracting relevant or similar images from large databases based on certain features of a query image. Automation of image retrieval solutions have reduced the otherwise time-consuming procedure. Conventionally, the image retrieval systems employ metadata based image retrieval (MBIR) or content based image retrieval (CBIR). These methods have constraints such as, but are not limited to, less precision, insufficient image processing, involves large amount of manual labor and time, lacks in capturing vital image features, irrelevant results, etc. Further, present image retrieval systems and methods do not provide a human level performance. Humans in general understand semantic meaning when looking at an image. Situations like a football match, a queue at the counter or a festival procession have a meaning which can be easily understood by humans.

Typically, existing image retrieval systems do not depict such capabilities which focus on human's visual interest and therefore do not provide results with precision. Further, image retrieval techniques retrieves images that are only specific to certain applications. The applications may include, but are not limited to, medical imaging, face matching (identification), brand name (Trademark) identification etc. Further, existing systems and methods cannot be utilized for image retrieval, if image, which is to be retrieved, relates to another application or domain type other than the application or domain type for which the image retrieval system is utilized. Further, existing systems does not perform well where entirely different entities in an image need to be identified for similar image retrieval. For example, situations wherein images containing several objects from various categories need to be identified.

Furthermore, it has been observed that if large scale variations, noise distortions, illumination changes, photometric changes, complex backgrounds, viewpoint changes, user interest and application requirements, occlusions occurs in a query image, therefore efficient image retrieval on such a large scale requires extensive training of network models for every possible application and present systems are not able to adapt quickly to such changes and therefore, provides inaccurate results.

In light of the aforementioned drawbacks, there is a need for a system and a method for automated semantic level image retrieval. There is a need for a system and a method for efficient automated search of similar images of different image type with increased accuracy and precision. There is a need for a system and method which is capable of being utilized for image retrieval of multiple applications and domains types. There is a need for a system and method for prioritizing object or category of interest and for automated identification of types and features of applications associated with an image. Furthermore, there is a need for a system and method that retrieves images which are noise distortion less, not blurry, robust to geometric variations, resistant to changes in illuminations and occlusion invariant.

SUMMARY OF THE INVENTION

In various embodiments of the present invention, a method for retrieval of similar images related to query images is provided. The method is implemented by a processor executing instructions stored in a memory. The method comprises pre-processing the query images for noise removal by selecting a filtering technique for each query image based on a noise variance estimation in each of the query images with respect to a pre-set noise variance threshold value. The method further comprises pre-classifying the pre-processed query images for determining a class one image identifier. The method further comprises generating one or more image types from the pre-processed query images for determining a class two image identifier. The method further comprises extracting features from the pre-classified query images based on the class one image identifier and from the generated images based on the class two image identifier. The method further comprises retrieving one or more images similar to the query images. The retrieved similar images have features similar to the extracted features of the pre-classified query images and the generated images. The method further comprises ranking the retrieved similar images for determining the most similar images with respect to the query images. Further, the method comprises analyzing similarity between the query images and the retrieved similar images. Further, based on the analysis the retrieved similar images are re-ranked.

In various embodiments of the preset invention, a system for retrieval of similar images related to query images is provided. The system comprises a memory storing program instructions, a processor configured to execute program instructions stored in the memory and an image processing engine in communication with the processor. The system is configured to pre-process the query images for noise removal by selecting a filtering technique for each query image based on a noise variance estimation in each of the query images with respect to a pre-set noise variance threshold value. The system is further configured to pre-classify the pre-processed query images for determining a class one image identifier. The system is further configured to generate one or more image types from the pre-processed query images for determining a class two image identifier. The system is further configured to extract features from the pre-classified query images based on the class one image identifier and from the generated images based on the class two image identifier. The system is further configured to retrieve one or more images similar to the query images. The retrieved similar images have features similar to the extracted features of the pre-classified query images and the generated images. The system is further configured to rank the retrieved similar images. The retrieved similar images are ranked for determining the most similar images with respect to the query images. Further, the system is configured to analyze similarity between the query images and the retrieved similar images. Further, based on the analysis the retrieved similar images are re-ranked.

In various embodiments of the present invention, a computer program product is provided. The computer program product comprises a non-transitory computer-readable medium having computer-readable program code stored thereon, the computer-readable program comprising instructions that, when executed by the processor, causes the processor to pre-process the query images for noise removal by selecting a filtering technique for each query image based on a noise variance estimation in the query images with respect to a pre-set noise variance threshold value. Further, the processor is caused to pre-classify the pre-processed query images for determining a class one image identifier. Further, the processor is caused to generate one or more image types from the pre-processed query images for determining a class two image identifier. Further, the processor is caused to extract features from the pre-classified query images based on the class one image identifier and from the generated images based on the class two image identifier. Further, the processor is caused to retrieve one or more images similar to the query images. The retrieved similar images have features similar to the extracted features of the pre-classified query images and the generated images. Further, the processor is caused to rank the retrieved similar images for determining the most similar image with respect to the query images. Further, the processor is caused to analyze similarity between the query images and the retrieved similar images. Further, based on the analysis the retrieved similar images are re-ranked.

BRIEF DESCRIPTION OF THE ACCOMPANYING DRAWINGS

The present invention is described by way of embodiments illustrated in the accompanying drawings wherein:

FIG. 4 illustrates an exemplary computer system in which various embodiments of the present invention may be implemented.

DETAILED DESCRIPTION OF THE INVENTION

The present invention discloses a system and a method for semantic level image retrieval. The invention provides a system and a method which has built-in learning mechanism for robust image retrieval. The invention provides a system and a method for retrieval of images which are similar to the query image with increased accuracy and precision. The invention provides for a mechanism for image retrieval by identifying application and its features for improved results. Further, the invention provides for image retrieval by prioritizing object of interest using visual saliency and object features. Further, the invention provides for pre-processing techniques for noise removal by applying an appropriate filtration technique based on the amount of noise present in the query image with minimized computation time for image retrieval. Furthermore, the invention provides for a system and a method for image retrieval which assesses geometric variations, resistant to changes in illuminations and blur, occlusion invariant, etc. Yet further, the invention provides for a system and a method which appends a similarity description of the query image with respect to the retrieved image based on image properties.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
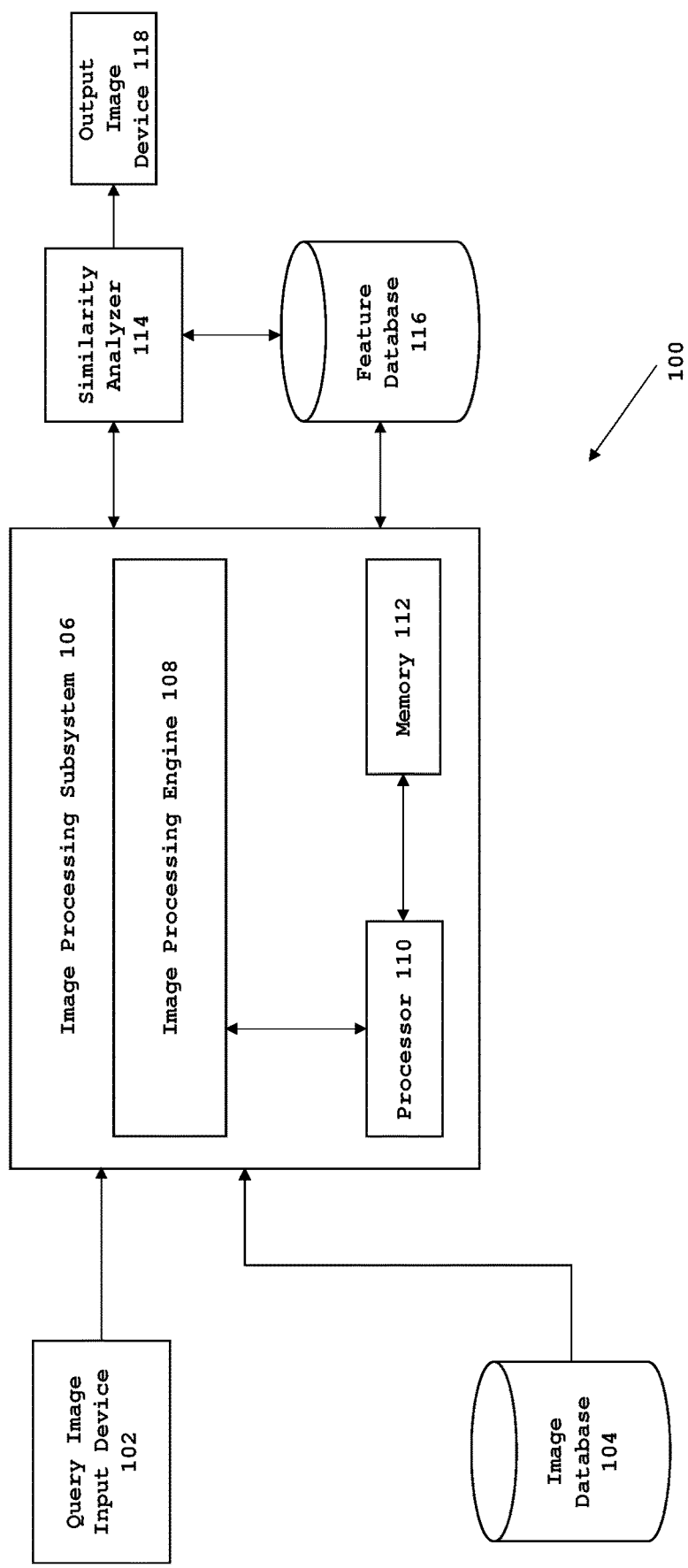
FIG. 1 illustrates a block diagram of a system for image retrieval, in accordance with various embodiments of the present invention.

FIG. 1 illustrates a block diagram of a system 100 for semantic level image retrieval, in accordance with various embodiments of the present invention. Referring to FIG. 1, the system 100 comprises a query image input device 102, an image database 104, an image processing subsystem 106, a similarity analyzer 114, a feature database 116 and an output image device 118. In another embodiment of the present invention, the image processing subsystem 106 may be implemented as a client-server architecture, wherein the query image input device 102 accesses a server hosting the subsystem 106 over a communication network. In an exemplary embodiment of the present invention, the image processing subsystem 106 may be accessed through a web address via the query image input device 102.

In another embodiment of the present invention, the image processing subsystem 106 may be implemented in a cloud computing architecture in which data, applications, services, and other resources are stored and delivered through shared data-centers. In an exemplary embodiment of the present invention, the functionalities of the image processing subsystem 106 are delivered to the query image input device 102 as software as a service (SaaS) over respective communication networks.

In an embodiment of the present invention, the image processing subsystem 106 receives query images from users via query image input devices 102. In an exemplary embodiment of the present invention, the query image input device 102 may be an application programing interface (API) via which the query image is received by the image processing subsystem 106. In another exemplary embodiment of the present invention, the query image input device 102 may include any interface via which a query image is transmitted and received by the image processing subsystem 106. Examples of the interface may include, but are not limited to, a computing system, a keyboard, a joystick, an optical scanner, a digital camera, a user interface (UI), a laptop, a mobile phone, a tablet, a gaming device or the like. The query image input device 102 is connected to the image processing subsystem 106 via a communication channel (not shown). The communication channel (not shown) may include, but is not limited to, a wire or a logical connection over a multiplexed medium, such as, a radio channel in telecommunications and computer networking. The examples of telecommunications and computer networking may include a local area network (LAN), a metropolitan area network (MAN), a wide area network (WAN) or any wired or wireless network.

In an embodiment of the present invention, the image database 104 may be maintained in a storage server at a location local or remote to the image processing subsystem 106. In an embodiment of the present invention, the storage server (not shown) may be a cloud based server. In another embodiment of the present invention, the image database 104 may be maintained in a separate storage within the image processing subsystem 106. The image database 104 comprises large number of stored images out of which images are fetched based on similarity with the query images are received by the image processing subsystem 10 from the users. The images stored in the image database 104 may include, but are not limited to, images of persons, objects, vehicles, food items, artistic images, furniture, animals, birds, insects, fishes, nature, trees, plants, landscapes, clothes, apparels, shoes, fashion, logos, brand names, monuments, buildings, places, parks, gardens, sceneries, paintings, text images, landmarks, satellite images, motion images, graphics interchange format (GIF) images, medical images, camera captured images, photographs, products etc. Further, the images stored are in a form which may include, but are not limited to, color, grayscale, sketch, document or the like.

In an embodiment of the present invention, the image processing subsystem 106 interfaces with the query image input device 102 and the image database 104 for receiving, retrieving and processing images. Further, the image processing subsystem 106 interfaces with the similarity analyzer 114 for providing features of query images and retrieved images for similarity analysis and receiving feedback from the similarity analyzer 114 for narrowing down the similar images retrieval process and further the image processing subsystem 106 interfaces with the feature database 116 for indexing the features of retrieved images, such that the indexed features are utilized for fast image retrieval. In an exemplary embodiment of the present invention, the image processing subsystem 106 interfaces with the query image input device 102, the image database 104, the similarity analyzer 114 and the feature database 116 via a communication channel (not shown). The communication channel (not shown) may include, but is not limited to, a wire or a logical connection over a multiplexed medium, such as, a radio channel in telecommunications and computer networking. The examples of telecommunications and computer networking may include a local area network (LAN), a metropolitan area network (MAN), a wide area network (WAN) or any wired or wireless network.

Further, the image processing subsystem 106 comprises an image processing engine 108, a processor 110 and a memory 112. The image processing engine 108 is operated via the processor 110 specifically programmed to execute instructions stored in the memory 112 for executing functionalities of the image processing engine 108 in accordance with various embodiments of the present invention. The image processing engine 108 is a pre-trained and self-learning engine configured to automatically process and analyze the received query image for noise removal, image enhancement, classifying the image based on its type and application, extracting features in hierarchical order of categories. The image processing engine 108 is trained using cognitive techniques, which may include, but are not limited to, artificial intelligence, machine learning, deep learning or the like to provide semantic level image retrieval with accurate, similar and precise results.

In various embodiments of the present invention, the image processing engine 108 is configured to receive query images from users via the query image input device 102. The query images received are those images with respect to which similar images are to be retrieved from the image database 104. The query images may include, but are not limited to, images of persons, objects, vehicles, food items, art, furniture, flora and fauna, nature, landscapes, clothes, apparels, shoes, fashion, logos, brand names, trademarks, monuments, buildings, places, parks, gardens, sceneries, paintings, text images, landmarks, satellite images, motion images, medical diagnosis, camera captured images, photographs, accessories, products etc. Further, the query image may be in color, grayscale, sketch, document form or the like. The input query image may be a clear image or may have unwanted defects such as, but are not limited to, noise, blur, illumination issues, camera distortions, motion distortions, occlusions, populated with objects or the like.

In an embodiment of the present invention, the image processing engine 108 is configured to remove noise from the query image, correct illumination and enhance the query image. The denoising is carried out by applying an appropriate filtering technique by estimating noise variance with respect to a pre-set threshold value of noise variance ($\sigma$). In an exemplary embodiment of the present invention, the threshold value associated with noise variance ($\sigma$) is 50 and may vary depending upon noise removal requirements. The noise variance estimation is performed to determine the type of filtering technique to be applied for denoising the query image. The filtering techniques applied may include an auto-encoder technique and a median filtering technique. If the estimated noise variance is higher than the threshold value the auto-encoder filtering is used as the bias and mean squared error (MSE) may become difficult to compute and if the estimated noise variance is less than the threshold value the median filtering technique is used. Denoising the query images by utilizing the appropriate filtering technique based on the estimated noise variance provides accurate image retrieval. Further after denoising, blur is removed and illumination of the query images is corrected to minimize the lighting variations in the images. The illumination correction technique may include, but is not limited to, morphological operations such as, dilation, erosion and maximizing/minimizing. Further, after illumination correction the query image is enhanced. The denoising, illumination correction and image enhancement of the query images increases the accuracy for similar image retrieval.

In an embodiment of the present invention, the image processing subsystem 106 is configured to determine a class one image identifier. The class one image identifier classifies the pre-processed query image into an image type and an application type. The image type of the query image may include, but is not limited to, artistic, sketch, grayscale, color, document or the like. The application type of the query image is a high level understanding of the domain of an image to which it may relate which may include, but is not limited to, apparel, fashion, medical diagnosis, person, scenery images, vehicle, retail catalogs, trademarks or the like. The pre-classification of the query image is carried out using cognitive techniques such as, but are not limited to, machine learning techniques, deep learning techniques or the like. In an exemplary embodiment of the present invention, the machine learning and deep learning techniques applied may include, but are not limited to, pre-trained neural networks such as, Convolutional Neural Network (CNN) and classification techniques such as, but not limited to, k-Nearest Neighbors (k-NN) technique or the like. Pre-classifying the pre-processed image into the image type and the application type narrows down the image retrieval into specific type for faster and accurate image retrieval.

In an embodiment of the present invention, the image processing subsystem 106 is configured and trained to generate images from pre-processed query images for determination of a class two image identifier. The class two image identifier relates to a different image type, a similar and a dissimilar image generated from the pre-processed images. Examples of different types of images generated may include, but are not limited to, color image to grayscale image, sketch image to color image, grayscale image to color image etc. Example of similar images may include, but are not limited to, if a pre-processed image is a color image of an object with particular background, therefore, similar image may be an image of same object with different backgrounds. An example of dissimilar images (similar images with different category) are generated which may include, but are not limited to, if a pre-processed image is a color image of a horse then a dissimilar image may be of a zebra or if a pre-processed image is a color image of a camel then a dissimilar image may be of a lama. In an exemplary embodiment of the present invention, different type as well as the similar or dissimilar images are generated using artificial intelligence and machine learning based image generation techniques which may include, but are not limited to, generative adversarial networks (GAN) techniques or the like. The image generation using GAN techniques allows to achieve generalization across different types of images and to introduce variations of same object under various possible real-time environment changes.

In an embodiment of the present invention, the image processing subsystem 106 is configured to select and extract features of the pre-classified and generated images based on the class one image identifier and the class two image identifier. The selection and extraction of features is carried out by utilizing features such as, but are not limited to, local features, global features, deep learning features, hierarchical object features and application specific features. The features selected and extracted are image centric, object centric and application specific. The image centric features may include, but are not limited to, features of original query images, grayscale images, sketch images, color images, similar images, and dissimilar images. The object centric features may include, but are not limited to, fine-grained object features, shallow (high level) object features and segmentation (region of interest in an image) features. The application specific features may or may not be present in an image and relates to the domain of the query image and further include text specific features. In various embodiment of the present invention, the feature selection and extraction is carried out by utilizing techniques such as, but not limited to, image centric feature extraction, visual saliency techniques, object detection, segmentation, application specific features extraction, text specific features extraction or the like. The selection and extraction of features is carried out to provide the image processing subsystem 106 a semantic level understanding of images and further to obtain scalability of object detection with fine-grained detection results. Further, a feedback is received by the image processing subsystem 106 from the similarity analyzer 114 based on similarity analysis, if a large number of similar images exists, to hierarchically narrow down the retrieval process and obtain fine-grained object detection results as well as features.

In an embodiment of the present invention, the feature database 116 is configured to interact with the image database 104 via the image processing subsystem 106. The feature database 116 interacts with the image database 104 for processing stored images for extracting various features of the stored images such that the extracted features are utilized further for fast image retrieval. In various embodiments of the present invention, the images stored in the image database 104 are processed by utilizing the processing, classification and feature extraction techniques by the image processing subsystem 106. Further, the feature database 116 is configured to receive the extracted features of query images via the image processing subsystem 106. Therefore, after feature extraction of the query image are received by the feature database 116, the features are matched with the stored features for faster image retrieval from image database 104. The features are stored using various indexing techniques for retrieval of similar images. In an exemplary embodiment of the present invention, various indexing techniques are applied based on the features of the image to be indexed which may include, but are not limited to, locality-sensitive hashing for image centric features, instance similarity deep hashing for object centric features and application centric feature or the like.

In an embodiment of the present invention, the similarity analyzer 114 is configured to first analyze extracted features of the query images and stored features of the stored images, based on the selected and extracted features of query images. The similarity analysis is carried out for invoking the feature database 116 for feature matching with stored features and retrieval of similar images from the image database 104. The features are analyzed based on weightages given to an image among similar images. The weightages are calculated based on the number of times an image has appeared across all similar images. At this stage, images similar to query image(s) are retrieved from the image database 104 based on image features, relevant object features present in the image and application and text features present in the image. In an exemplary embodiment of the present invention, a list of top 'N' or more images are obtained from the image database 104 based on their features. The top 'N' relevant images are ranked based on weightages assigned, to provide only those images which are most similar with respect to a query image. If grayscale images, sketch images, similar and dissimilar images are obtained, their features are weighted using term-frequency, i.e. a higher priority is given to images that is found across the 'N' images. These weighted features are termed as image centric features and are assigned a weightage of 0.3. A term-frequency is further used for fine-grained, shallow object and segmentation features. Further, these object-level features are assigned a weightage of 0.7 as they provide asemantic level features. Further, if application-specific features are used, a weightage of 0.3 is assigned. Further, the weightage proportions for image centric and object-level feature reduce to 0.2 and 0.5 respectively to provide object-level feature images over the image centric feature images.

In another embodiment of the present invention, the similarity analyzer 114 is configured to further analyze similarity between images i.e. a similar image retrieved from the image database 104 is analyzed with respect to the query image. The similarity analysis is carried out based on features which may include, but are not limited to, image type analysis, photometric analysis, geometric analysis, object analysis, noise analysis, text analysis and application type analysis or the like of both the retrieved and query images. Further, if more than one image similar to the query is retrieved from the image database 104, then all the images are ranked or labelled according to their resemblance to the query image. Further, the similar images may be re-ranked with respect to the closest similar image. The ranking or labelling of images is carried out to ascertain whether to narrow down the sub-categories of images or not, for faster image retrieval. Further, the similarity analyzer 114 is configured to send a feedback to the image processing engine 108, if similar image features exist in the feature database 116, for efficient feature identification, selection and extraction.

In yet another embodiment of the present invention, the similarity analyzer 114 is configured to provide a description of similarity of the query image with respect to retrieved similar images from the image database 104. The description provides information which may include, but is not limited to, the desired content present, desired object present, information relating to dissimilarity of query images with respect to retrieved images or the like.

In an embodiment of the present invention, the output comprising similar images after similarity analysis with similarity description from the similarity analyzer 114 are provided to an output image device 118. The output image device 118 may include, but is not limited to, an API, UI, a computing device, a mobile phone, a tablet, laptop or the like. The subsystem 106 via the similarity analyzer 114 is connected to the output image device 118 via a communication channel (not shown). The communication channel (not shown) may include, but is not limited to, a wire or a logical connection over a multiplexed medium, such as, a radio channel in telecommunications and computer networking. The examples of telecommunications and computer networking may include a local area network (LAN), a metropolitan area network (MAN), a wide area network (WAN) or any wired or wireless network or the like.

Figure 2:
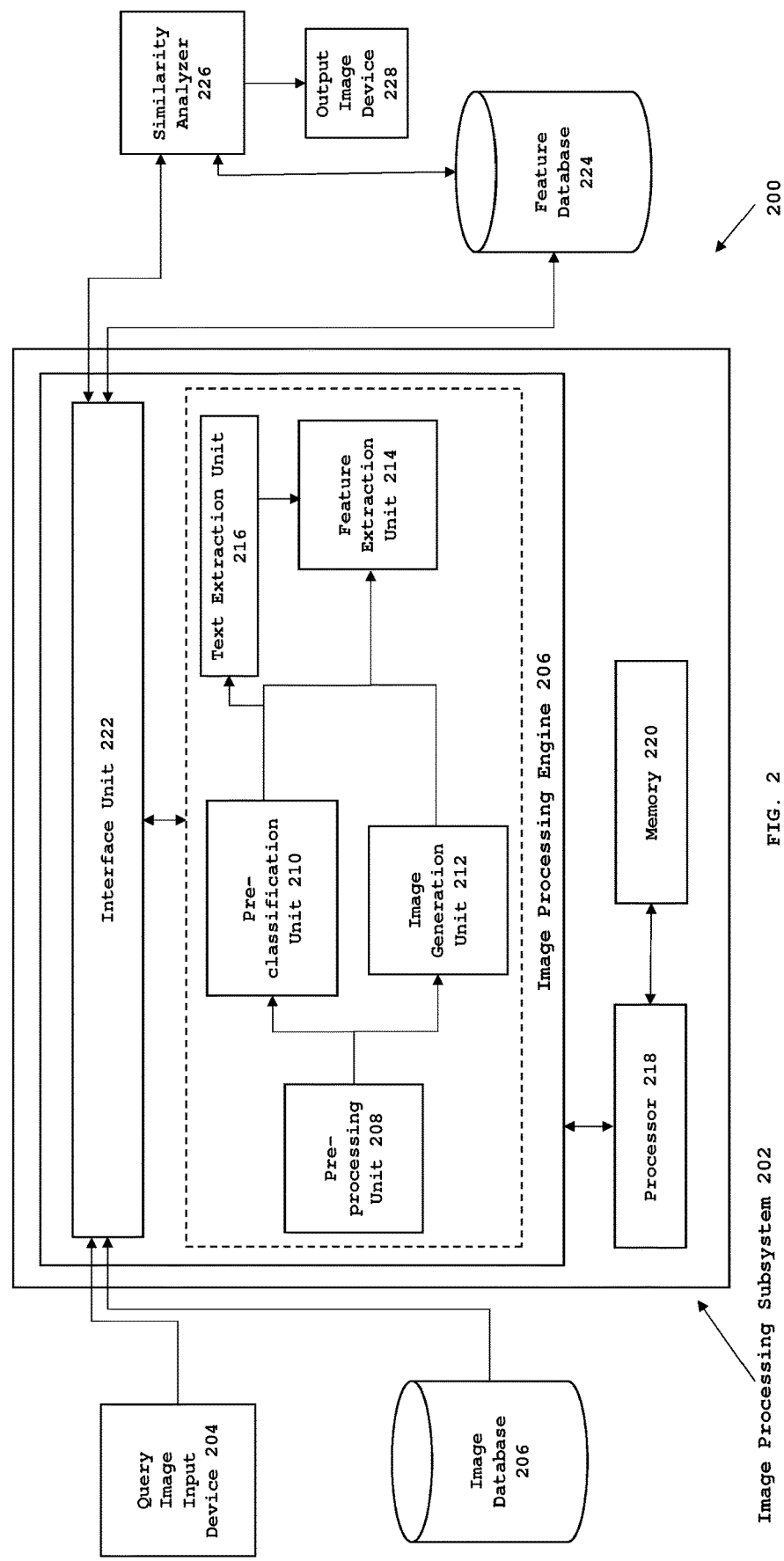
FIG. 2 illustrates a detailed block diagram of a semantic level image retrieval system, in accordance with various embodiments of the present invention.

FIG. 2 is a detailed block diagram of an image processing system, in accordance with various embodiments of the present invention.

The image processing subsystem 202 interfaces with a query image input device 204 for receiving and processing query images for similar image retrieval. Further, image processing subsystem 202 interfaces with an image database 206 for retrieving similar images as compared to query images and processing stored images before being provided as similar image as compared to the query image. Further, the image processing subsystem 202 interfaces with a feature database 224 for extracting and storing features of the images stored in the image database 206. The extracted features stored in the feature database 224 facilitates fast retrieval of stored images from the image database 206 when the features of query images matches with the stored features. The image processing subsystem 202 interfaces with the similarity analyzer 226 for providing the features extracted from the query images for similarity analysis with the stored features of the similar image and for receiving feedback based on the similarity analysis of the retrieved images and the query images. Further, the image processing subsystem 202 is capable of being trained using various cognitive techniques for performing functionalities. The cognitive techniques applied may include, but are not limited to, artificial intelligence, machine learning, deep learning or the like. The image processing subsystem 202 comprises an image processing engine 206, a processor 218 and a memory 220.

In various embodiments of the present invention, image processing engine 206 has multiple units which work in conjunction with each other for processing received query images. The various units of the image processing engine 206 are operated via the processor 218 specifically programmed to execute instructions stored in a memory 220 for executing respective functionalities of the units of the engine 206 in accordance with various embodiments of the present invention.

In an embodiment of the present invention, the image processing engine 206 comprises an interface unit 222, a pre-processing unit 208, a pre-classification unit 210, an image generation unit 212, a feature extraction unit 214 and a text extraction unit 216.

The interface unit 222 is configured to receive query images from the query image input devices 204 and transmit the received query image to the pre-processing unit 208. The interface unit 222 is further configured to receive the extracted features of the query images from the feature extraction unit 214. Further, the interface unit 222 communicates with the feature database 224 for transmitting extracted features of stored images from the image database 206 to the feature database 224 for indexing. Further, the interface unit 222 communicates with the image database 206 for transmitting the retrieved similar image to the pre-processing unit 208 and receive the extracted features of the retrieved similar image from the feature extraction unit 214. Furthermore, the interface unit 222 communicates with the similarity analyzer 226 for communicating output of the feature extraction unit 214 for similarity analysis between the extracted features of the query image(s) and extracted features of the retrieved similar image(s) and receive a feedback from the similarity analyzer 226 for communicating the feedback to the feature extraction unit 214 for narrowing down similar image categories using fine-grained features.

In an embodiment of the present invention, the pre-processing unit 208 is configured to receive query images from the query image input device 204 via the interface unit 222. Further, the query images received may be in a form which may include, but are not limited to, color, grayscale, sketch, document or the like. The received query images may be free from any unwanted defects or may contain some amount of defects such as, but are not limited to, noise, blur, illumination issues, camera distortions, motion distortions, occlusions, populated with objects or the like.

In operation, in an embodiment of the present invention, the pre-processing unit 208 is configured to remove noise and blur, correct illumination and enhance the received query images. Further, the type of noise present in the query images may include, but is not limited to, impulse noise, Gaussian noises, lens distortions, camera artifacts, motion blur or the like. The pre-processing unit 208 is configured to apply an auto-encoder based filtering technique or a median filter based filtering technique depending upon the noise variance ($\sigma$) level present in the query images. The application of the appropriate filtration technique is carried out based on the noise variance ($\sigma$) estimation in accordance with a pre-set noise variance threshold value. In an exemplary embodiment of the present invention, the pre-set threshold value associated with noise variance ($\sigma$) is considered to be 50 which may vary depending upon noise removal requirements. The noise variance level is estimated by utilizing standard deviation methods on a patch of the query image(s). In an exemplary embodiment of the present invention, if the estimated noise variance is greater than the pre-set noise threshold value, denoising is carried out using the auto-encoder technique as the bias and mean squared error (MSE) may become difficult to compute and if the noise variance is less than the pre-set noise threshold value, denoising is carried out using the median filtering technique. Therefore, the pre-processing unit 208 is configured to switch to the appropriate filtration technique for noise removal depending upon the estimated noise variance present in query images.

The pre-processing unit 208 is further configured to remove blur present in query images after noise removal before processing for illumination correction and enhancement. The output of only the median filtering technique is processed for blur removal before processing for illumination correction and enhancement. The output of the auto-encoder technique is directly processed for illumination correction and enhancement. The blur present in an image after denoising may be a motion blur or the like. The blur is first estimated using blur estimation techniques, such as, but are not limited to, steerable filter technique or the like. Further, the blur removal is carried out in accordance with a pre-set blur threshold value. If the estimated blur value is greater than the pre-set blur threshold value, then a blur removal technique such as, but is not limited to, Weiner deconvolution technique or the like is applied before illumination correction and enhancement. If the estimated motion blur is less than the pre-set blur threshold value the output of median filter is further processed for illumination correction and enhancement.

Furthermore, the pre-processing unit 208 is configured to process the query images for illumination correction and enhancement after noise removal and blur removal. The illumination correction and enhancement are carried out by utilizing techniques such as, but are not limited to, morphological operations or the like. The query images are converted from RGB to L*a*b*. After the conversion from RGB to L*a*b*, the image is processed for brightness enhancement using techniques such as, but are not limited to, histogram equalizer on lightness (L) channel. Thereafter, image is converted back to RGB from L*a*b*. The processed image is thus uniformly illuminated and enhanced.

The pre-classification unit 210 is configured to receive the pre-processed images from the pre-processing unit 208 after noise and blur removal, illumination correction and enhancement. In an embodiment of the present invention, the pre-classification unit 210 is configured to determine a class one image identifier. The determined class one image identifier pre-classifies the pre-processed query images into an image type and an application type. The pre-classification unit 210 applies deep learning techniques or the like for determination of the class one image identifier. In an exemplary embodiment of the present invention, the pre-classification unit 210 is configured to first classify the pre-processed query image into the image type. The image type of the pre-processed query image may include, but is not limited to, artistic, sketch, grayscale, color, document or the like. The image type of the pre-processed images is carried out by application of the artificial neural network technique such as, auto-encoder techniques or the like. After the application of the auto-encoder techniques, k-NN based classification technique is applied to further achieve accurate image classification for identifying the image types.

The pre-classification unit 210 is further configured to simultaneously classify the pre-processed images into an application type. The application type of the query image is a high level understanding of the domain to which an image may relate which may include, but is not limited to, apparel, fashion, medical diagnosis, person, scenery images, vehicle, retail catalogs, trademarks or the like.

In an exemplary embodiment of the present invention, the application type of the pre-processed images is identified by the pre-processing unit 210 based on three types of classification. The output of the three types of classification is combined together to identify the application type of a pre-processed image. The three type of classification includes firstly, deep learning based classification; secondly, text based classification; and lastly, computer vision based classification. The first type of classification relates to cognitive based classification using deep learning classification techniques, such as, neural network techniques which may include, but are not limited to, auto-encoder techniques, convolutional neural network (CNN) or the like. After the application of auto-encoder and CNN techniques, further classification is carried out by utilizing classification techniques which may include, but are not limited to, k-NN based classification or the like. The second type of classification relates to text based classification techniques. Firstly, the text in an image is converted to machine readable format for identifying text in the pre-processed image by applying techniques which may include, but are not limited to, an optical character recognition (OCR) technique or the like. After OCR, a text classification is carried out by extracting term frequency-inverse document frequency (TFIDF). Thereafter, applying classification techniques for text classification such as, but are not limited to, a Naïve Bayes classifier or the like. Thereafter, the third type of classification is carried out which relates to computer vision based classification techniques. Firstly, the local features of the pre-processed images are extracted. The local feature extraction is carried out by utilizing techniques such as, but are not limited to, Harris corner detector (for key point detection), Oriented FAST and rotated BRIEF (ORB) techniques (for feature descriptor) or the like. Thereafter, another image classification technique is applied on the extracted local features such as, but not limited to, Bag of Visual Words (BOVW). A codebook is generated using k-means clustering technique by clustering similar feature vectors such that the similar feature vectors are placed close to each other as compared to other vectors. Subsequently, a Naïve Bayes classifier based classification technique is applied on the clustered similar feature vectors for classification of clustered images. Further, after classification of pre-processed images using the above elaborated three techniques, the output of the three types of classification applied are combined for identifying application type of the pre-processed image using machine learning based ensemble techniques, which may include, but are not limited to, stacking technique or the like. The confidence scores of all the three classification techniques are calculated and are aggregated by the pre-classification unit 210 to provide the application type of the pre-processed image.

In an embodiment of the present invention, the pre-processed images from the pre-processing unit 208 are fed to the image generation unit 212. The image generation unit 212 is configured to generate images from pre-processed query images for determination of a class two image identifier. The class two image identifier may relate to a different image types, a similar and a dissimilar image types generated from the pre-processed query images. The different types, similar and dissimilar images of the pre-processed query images are generated for increasing variations of the pre-processed query image such that the image search and identification for image retrieval from the image database 206 may be carried out effectively. The image generation unit 212 is configured to be trained by utilizing cognitive techniques such as, but are not limited to, machine learning techniques, deep learning techniques or the like. The machine learning based image generation techniques are used to train the image generation unit 212 and thereafter generate images. The machine learning techniques may include, but are not limited to, generative adversarial networks (GAN) techniques or the like. Further, the pre-processed image received by the image generation unit 212 may be a color image, sketch image, a grayscale image or a document image. The different types of GAN techniques are applied to generate images of different types, similar and dissimilar types.

Firstly, if a pre-processed image is a color image, it may be used to generate a different type of images (a sketch image, grayscale image or a text image), similar images and dissimilar images. The sketch image is generated from a color image using a domain transfer GAN technique which may include, but is not limited to, image to image translation GAN or the like. Grayscale image is generated from a color image by applying a grayscale conversion technique or the like. A similar image of a color image is generated by applying domain transfer GAN technique or the like. Therefore, a similar image is generated from a color image by translating the color image to another different image which is completely different from the said color image. For instance, image translation is performed by mapping objects of the said color image to another collection of objects thus rendering a completely different image. Further, the generated different image is translated to a new color image. The new color image is generated using domain transfer GAN technique which may include, but is not limited to, image to image translation GAN. Further, the differences between the first color image and the generated new color image are minimized by utilizing the trained CNN in cyclic manner, such that the first color image and the generated new image have minimum differences with respect to each other and the first color image resembles the generated new color image. The dissimilar images are generated using a GAN technique, such as, but is not limited to, a domain transfer cycle GAN technique or the like. Further, an image is generated in the form of a text by applying image captioning GAN technique or the like. For example, if a pre-processed image is of a monument, then the image is generated in the form of text depicting the name of that monument by applying image captioning GAN or the like.

Secondly, if a pre-processed image is a grayscale image it is first converted to color image by application of colorization techniques or the like by the image generation unit 212. In an exemplary embodiment of the present invention, the colorization is achieved by the image generation unit 212 by using a neural network built for this purpose. The neural network used may include, but is not limited to, a Convolutional Neural Network (CNN) or the like. Further, the color image generated from the grayscale image is converted to sketch image, similar and dissimilar images and image with caption. The sketch image is generated from a color image using a domain transfer GAN technique which may include, but is not limited to, image to image translation GAN or the like. A similar image of a color image is generated by applying domain transfer GAN technique or the like. Therefore, a similar image is generated from a color image by translating the color image to another different image which is completely different from the said color image. Further, the generated different image is translated back to the said color image which is a new color image. The new color image is generated using domain transfer GAN technique which may include, but is not limited to, image to image translation GAN. Further, the differences between the first color image and the generated new color image are managed by utilizing the trained CNN in cyclic manner, such that the first color image and the generated new image have minimum differences with respect to each other and the first color image resembles the generated new color image. The dissimilar images are generated using a GAN technique, such as, but is not limited to, a domain transfer cycle GAN technique or the like. Further, an image is generated in the form of a text by applying image captioning GAN technique or the like.

Lastly, if a pre-processed image is a sketch image, it is first converted to color image by application of image to image translation GAN or the like by the image generation unit 212. Further, the color image generated from the sketch image is converted to gray scale image, similar and dissimilar images and image with caption. The grayscale image is generated from the color image by applying a grayscale conversion technique or the like. A similar image of a color image is generated by applying domain transfer GAN technique or the like. Therefore, a similar image is generated from a color image by translating the color image to another different image which is completely different from the said color image. Further, the generated different image is translated back to the said color image which is a new color image. The new color image is generated using domain transfer GAN technique which may include, but is not limited to, image to image translation GAN. Further, the differences between the first color image and the generated new color image are minimized by utilizing the trained CNN in cyclic manner, such that the first color image and the generated new image have minimum differences with respect to each other and the first color image resembles the generated new color image. The dissimilar images are generated using a GAN technique, such as, but is not limited to, a domain transfer cycle GAN technique or the like. Further, an image is generated in the form of a text by applying image captioning GAN technique or the like.

In an embodiment of the present invention, the feature extraction unit 214 is configured to receive the outputs of the pre-classification unit 210 and the image generation unit 212. The feature extraction unit 214 is configured to select and extract image features based on the class one image identifier and the class two image identifier received from the pre-classification unit 210 and the image generation unit 212 for narrowing down the sub-categories of objects present in the query images when large number of similar images exists in the image database 206. The features are extracted using three methods which may include, firstly, image centric feature extraction; secondly, object centric feature extraction; and lastly, application specific feature extraction. In an exemplary embodiment of the present invention, the output of the image generation unit 212 comprising the generated grayscale images, sketch images, similar and dissimilar images, received by the feature extraction unit 214, are subjected to image centric feature extraction. Further, a color image is subjected to object centric feature extraction by the feature extraction unit 214 received from the image generation unit 212. For instance, object centric features are extracted using color image (RGB format (3 channel)). Query images which are gray (1 channel) or are sketch images (1 channel) may not be appropriate for object centric features extraction. Therefore, the query image is transformed to color image using the image generation unit 212. Further, similar and dissimilar color images are generated to maximize variations of color images for easily identifying similar images and not omitting any image from the image database 206 having variations with respect to the color image. Furthermore, the output of the pre-classification unit 210 containing the image type and application type of a pre-processed image and the extracted text, fed via the text extraction unit 216 to the feature extraction unit 214, is subjected to application specific feature extraction.

In an embodiment of the present invention, the image centric features extraction techniques applied by the feature extraction unit 214 for feature extraction from the generated grayscale images, sketch images, similar and dissimilar images may include, local features extraction, global features extraction, CNN technique based feature extraction and auto-encoder technique based feature extraction. In an exemplary embodiment of the present invention, the local feature extraction is carried out based on local feature extraction techniques which may include, but are not limited to, Harris corner detector technique (for key point detection), Oriented FAST and rotated BRIEF (ORB) techniques or the like. Further, the global feature extraction is carried out based on global feature extraction techniques which may include, but are not limited to, joint color descriptor (JCD) or the like. Furthermore, the CNN technique based feature extraction is carried out using weights of a pre-trained CNN. Yet further, the auto-encoder technique based feature extraction is carried out by a pre-trained auto-encoder network. The image centric features extracted may include original image features, grayscale image features, similar image features, dissimilar image features and sketch image features.

In another embodiment of the present invention, the object centric features extraction techniques applied by the feature extraction unit 214 for features extraction from the received generated color image may include, visual saliency techniques, shallow level object detection techniques and image segmentation techniques.

In an exemplary embodiment of the present invention, the object centric features extraction provides a semantic level understanding of the images for extraction of similar images from the image database 206. Firstly, the object present in an image is selected for feature extraction. Large number of objects may be present in an image, the objects present in an image are identified and categorized i.e. narrowed down in a hierarchical manner using visual saliency techniques for selecting objects. The objects are selected based on identifying regions of interest for extracting deeper level of object features. The hierarchical manner of object detection is carried out for improving scalability of object detection when large number of objects exists in the received pre-classified images and generated color images. The hierarchical manner of object detection in an image ranges from shallow (high level) level category to deeper level category. The hierarchical manner of object detection is carried out if large number of similar images which are to be retrieved exists in the image database 206 and a feedback is to be provided to the feature extraction unit 214 by the similarity analyzer 226 for efficient image feature extraction. For example, the shallow level of an object present in an image may be a vehicle, person, furniture, animal, plant, etc. The deeper level understanding of an object in an image if a vehicle may be a bus, car, bike, etc. Further, deeper level understanding of an object in an image, if a car, may be hatchback, sedan, SUV, luxury car, etc. Further, deeper level understanding of an object in an image of a hatchback car may be brand type, cost and so on. Therefore, a hierarchical level of object identification and selection is carried out by object feature selection and extraction using the visual saliency technique by the feature extraction unit 214 for fast extraction of object features present in the image. The visual saliency technique applied uses deep learning techniques which may include, but are not limited to, CNN based visual saliency or the like. For example, if a large number of similar images exist which are to be retrieved from the image database 206, then the visual saliency techniques are applied on the pre-processed and generated images for extracting and ranking of similar objects present in these images based on similarity with the query images. The visual saliency technique scans relevant objects present in the image for narrowing down the images. Further, the features of object are ranked based on their similarity with the query image and based on this ranking the retrieved images are ordered. Secondly, after object selection, further deeper level of object detection is carried out using techniques such as, but are not limited, fine-grained object detection technique or the like. Thereafter, object features are extracted from region of interest of object.

In another exemplary embodiment of the present invention, after deeper level of object feature extraction using visual saliency technique, the shallow level object detection techniques are applied for shallow level objection detection of a color image by the feature extraction unit 214. The shallow level of object detection is carried out using a machine learning technique, which may include, but is not limited to, mask region-CNN (RCNN) or the like. Object are selected at a shallow level and features of object at shallow level are extracted. In yet another exemplary embodiment of the present invention, the image may be segmented using image segmentation techniques. A particular region of interest may be segmented from other objects present in a color image. The segmentation technique applied may be a machine learning technique, which may include, but is not limited to, mask region-CNN (RCNN) or the like. After image segmentation, the segmentation features are extracted from the region of interest of segmented color image. Therefore, the object centric features extracted may be classified as fine-grained object features, shallow object features and segmentation features.

In yet another embodiment of the present invention, the application specific feature extraction techniques applied by the feature extraction unit 214 for feature extraction from the received image type, application type and extracted text may include, application specific feature extraction techniques or the like. For example, if an application relates to retail, then brand name and logo is extracted as application specific features. Further, various other use cases may be provided. The application specific features may further be classified as text specific features. The application features are determined depending upon the use cases by utilizing a pre-classified application type. For example, if a pre-classified image is a product catalog, then product text attributes and logo features are extracted or if a pre-classified image is a fashion apparel image then gender, wearing types and logo features are extracted etc. In an exemplary embodiment of the present invention, CNN based feature extraction models are trained and are used for extracting features. In another exemplary embodiment of the present invention, pre-trained weightages which are built for a particular application are used for extracting features.

In an embodiment of the present invention, the feature database 224 is configured to store features of stored images which are to be retrieved. The image database 206 stores various types of images which are to be retrieved. In an embodiment of the present invention, the images stored in the image database 206 are pre-processed, pre-classified, generated and features are extracted from these images. Further, the features are extracted from the pre-classified stored images and images generated from the stored images. The features extracted from the stored images are communicated to the feature database 224 for storage. The feature in the feature database 224 are stored in three categories. The three categories may include, firstly, image centric feature storage; secondly, hierarchical object and segmentation features; and lastly, text related features storage. The stored feature categories may be stored and accessed using various indexing techniques for fast similar image retrieval from the image database 206. The image centric features stored may include, but are not limited to, color image features, grayscale image features, similar image features, dissimilar image features, sketch image features or the like. The hierarchical object and segmentation features stored may include, but are not limited to, various object features stored in hierarchical manner. The text related features stored may include, but is not limited to, various text types or the like. For example, text and words are stored as integers or as decimal value. The text and words are encoded as integers or decimals by utilizing vectorization techniques. Further, features such as term-frequency (TF) and inverse-document-frequency (IDF) are extracted after vectorization.

In an embodiment of the present invention, the similarity analyzer 226 is configured to receive the extracted features of the query images and the generated images from the feature extraction unit 214. The similarity analyzer 226 is configured to firstly, analyze features extracted from the pre-classified query images and generated images with the stored images features for similar image retrieval from the image database 206 with respect to the received extracted features of the query image for similar image retrieval from the image database 206. Secondly, the similarity analyzer 226 performs a similarity analysis between the query image and the retrieved similar image and provide the similarity analysis as feedback to the feature extraction unit 214. Lastly, the similarity analyzer 226 provides a similarity description representing the resemblance of the query images with the retrieved similar images from the image database 206.

In an embodiment of the present invention, the similarity analyzer 226 is configured to analyze the extracted features of the pre-classified query images and generated images. The analyzed extracted features of the pre-classified query images and generated images may be categorized as, but are not limited to, image type features, generated image features, image object features, application type features or the like. The extracted pre-classified query image features and generated images features are analyzed with respect to the stored features of the stored images by invoking the feature database 224 to retrieve the indexed features. Thereafter, the extracted features of the pre-classified query image and generated images are matched by the similarity analyzer 226 with the received features from the feature database 224. After feature matching, the image database 206 is invoked by the similarity analyzer 226 for retrieving the images having similar features with respect to the extracted features of pre-classified query image and generated images. Thereafter, the first category of images retrieved is a list of most similar 'N' images from the image database 206 based on their feature resemblance after the feature match with the extracted features of the pre-classified query images and generated images. For example, if the received query image is a color image, the images collected and retrieved may include, a color image, a sketch image, a grayscale image or the like. Similarly, the second category of images retrieved is a list of most similar 'N' images from the image database 206 based on their resemblance with the generated similar and dissimilar images. Further, the third category of images retrieved is a list of most similar 'N' images based on resemblance of the objects features extracted from the pre-classified query image and the generated image and the retrieved similar image. The forth category of images retrieved is a list of most similar 'N' images based on application specific and text features present in the pre-classified query image and generated images and the retrieved similar image.

Further, after the retrieval of images a weighted term frequency is calculated to check the number of times an image has appeared across all retrieved similar images for providing the most similar image. A weighted term frequency is calculated for list of images retrieved based on similar image features and generated images category. Further, a weighted term frequency is calculated for list of images retrieved based on their object features. For example, the object features could be fine-grained, shallow and segmentation features. Therefore, higher weights are given to fine-grained object features. However, a weighted inverse term frequency is calculated for list of images retrieved based on application specific and text features. If higher weights similarity scores are provided to an image, that image is determined and ranked as most similar to the query image and is, therefore, selected for further analysis.

In another embodiment of the present invention, the similarity analyzer 226 after feature analysis and retrieving the most similar images, is configured to analyze the similar images i.e. the query image and the retrieved similar images with respect to each other's features in conjunction with the feature database 224. The analysis is performed for assessing similarity between images and their features. The similarity analyzer 226 performs at least three specific functions for assessing the similarity between images based on the features extracted. The three functions may include, firstly, determining similarity of a retrieved image with respect to the query image; and secondly, reordering of similar images based on their similarity with the query image; and lastly, providing feedback of similarity analysis to the feature extraction unit 214 for appropriate image features extraction by using fine-grained features, if large number of similar image which are to be retrieved exists in the image database 206.

The analysis for determination of similarity of a retrieved image with respect to the query image by the similarity analyzer 226 is performed in conjunction with the feature database 224. The analysis is performed with respect to various parameters which may include, but are not limited to, an image type analysis, a photometric analysis, an object analysis, a noise analysis, a text analysis, an application type analysis. The analysis parameters may be utilized for analyzing images. In operation, firstly, the image type analysis with respect to the similarity between the query image and selected similar image from the image database 206 is analyzed in conjunction with the features stored in the feature database 224. Secondly, the photometric analysis is performed wherein variation due to brightness and contrast changes are calibrated between images. In an exemplary embodiment of the present invention, the lightness (L) channel of L*a*b* color technique is utilized for brightness and contrast calibration. Thirdly, the geometric analysis is performed for determining affine transformation between images. In an exemplary embodiment of the present invention, the affine transformation analysis determines changes in rotation, translation and scale between images. Fourthly, the object level analysis is performed for similarity analysis at object level. In an exemplary embodiments of the present invention, the features extracted for each object in an image are accumulated and compared against those stored and indexed in the feature database 224. Further, the photometric analysis and geometric analysis may be performed at object level as well. Lastly, the noise analysis is performed based on noise distribution in the images. In an exemplary embodiment of the present invention, noise due to obstruction and occlusions may be determined based on number of key points of the image which are desired to be seen the similar images are retrieved and based on the number the level of occlusion noise can be estimated.

Further, after analysis of images, the similarity analyzer 226 is configured to rank the retrieved similar images based on their similarity with the query image and their features. In an exemplary embodiment of the present invention, the distance measurements techniques such as, but not limited to, Hamming, Euclidean and Earth movers distance or the like may be utilized for similarity analysis of retrieved similar images with the query image using a threshold value. Based on the ranks provided, the retrieved similar images are re-ranked and ordered with respect to their resemblance with the query image. Further, in yet another embodiment of the present invention, after similarity analysis, the similarity may be high provided the level of features extracted. Therefore, the similarity analyzer 226 communicates to the feature extraction unit 214 to provide a feedback with respect to the extracted finer features thereby reducing similarities. For example, feedback is provided for fine-grain feature extraction by utilizing visual saliency and shallow level features in the feature extraction unit 214. Further, the techniques are utilized to narrow down the images from the similar images obtained initially from the image database 104.

In yet another embodiment of the present invention, the similarity analyzer 226, after feature analysis and similarity analysis, is configured to provide a similarity description with regard to the resemblance of the query image to the retrieved similar images from the image database 206. In an exemplary embodiment of the present invention, the similarity description may provide information, but is not limited to, as to whether the desired content is present, desired object is present or desired object is not present or the like. With respect to an object in an image, the description may mention difference of the object in the retrieved images from the image database 206. For example, the description may state that a certain object translated by a displacement while at the same time it is rotated by a definite angle. In an exemplary embodiment of the present invention, the similarity analyzer 226 is configured to perform various techniques for comparing the query images and the retrieved images to provide the similarity description. The image type analysis is performed to determine whether the retrieved images are color, grayscale or sketch images. Further, variations in brightness and intensity are determined using photometric analysis involving the 'L' channel of L*a*b color space. Further, geometric analysis is carried out to compare affine related changes between the query images and the retrieved images. Further, variations in scale, translation and rotation may be measured. Further, noise analysis is carried out to estimate difference of noise present between query images and retrieved images. Further, the object level analysis is performed by utilizing feature key points which compares similar objects between images. Furthermore, text analysis may be performed using TF-IDF and OCR to compare similar textual information if present in the query and retrieved images. Furthermore, the retrieved images may be analyzed for detecting similar application as compared to the query image. Therefore, the similarity description is provided after analysis of query images and retrieved images. Further, the similarity description is generated in the form of a text which explains similarity of the retrieved images with respect to the query images. The text generation is carried out by utilizing a natural language processing (NLP) technique or the like, which compares the features between retrieved and query image and formalizes the comparison into a readable text.

In an embodiment of the present invention, the output similar images after similarity analysis with similarity description from the similarity analyzer 226 are provided to an output image device 228. The output image device 228 may include, but is not limited to, an API, UI, a computing device, a mobile phone, a tablet, laptop or the like. The subsystem 202 via the similarity analyzer 226 is connected to the image output device 228 via a communication channel (not shown). The communication channel (not shown) may include, but is not limited to, a wire or a logical connection over a multiplexed medium, such as, a radio channel in telecommunications and computer networking. The examples of telecommunications and computer networking may include a local area network (LAN), a metropolitan area network (MAN), a wide area network (WAN) or any wired or wireless network or the like.

Advantageously, in accordance with various embodiments of the present invention, the subsystem 202 is configured with built-in intelligence for processing the query image and retrieving an image similar to the query image. Further, the system 202 is capable of being trained for processing the received query images and retrieve images similar to it. The subsystem 202 is configured to automatically switch to an appropriate noise removal technique based on the estimated noise present in the query image. Further, the subsystem 202 automatically identifies the image type. For example, whether an image is a sketch image, color image, gray image or the like. The subsystem 202 is configured to automatically generate other variations of image types to identify similar images in all image types. For example, sketch image to color image, sketch image to color image, color image to gray image, gray image to color image, replicas of original images etc. may be generated. The subsystem 202 is configured to identify similar images in the image database 206 robustly. The subsystem 202 automatically identifies the application type of the query images and fine tunes itself for different applications. For example, the subsystem 202 may identify application types of a query image such as, but are not limited to, fashion, textile, person, vehicle, scenery, logo or the like. Further, the similarity analyzer 226 give less weightage for similar image with different category compared to those in similar category. For example, if the query image includes a famous monument, the retrieved images may belong to that particular monument and further the retrieved images may include monument images which are similar to or different from the monument category present in the query image but not exactly of the same category. Further, the text present in an image is extracted and used as a feature, therefore no additional information is provided. Furthermore, the subsystem 202 is capable of automatically identifying a similar image utilizing an object oriented search for an image i.e. it may search an in-painting image, images with visual effects or the like. Furthermore, the retrieved similar images may be ranked and re-ranked with respect to their similarity with the query image for fast retrieval. Furthermore, the features of the stored images are extracted and stored before-hand and are matched with the features of the processed query images for fast similar image retrieval. Yet further, the subsystem 202 is capable of providing faster and efficient image retrieval results.

Figure 3:
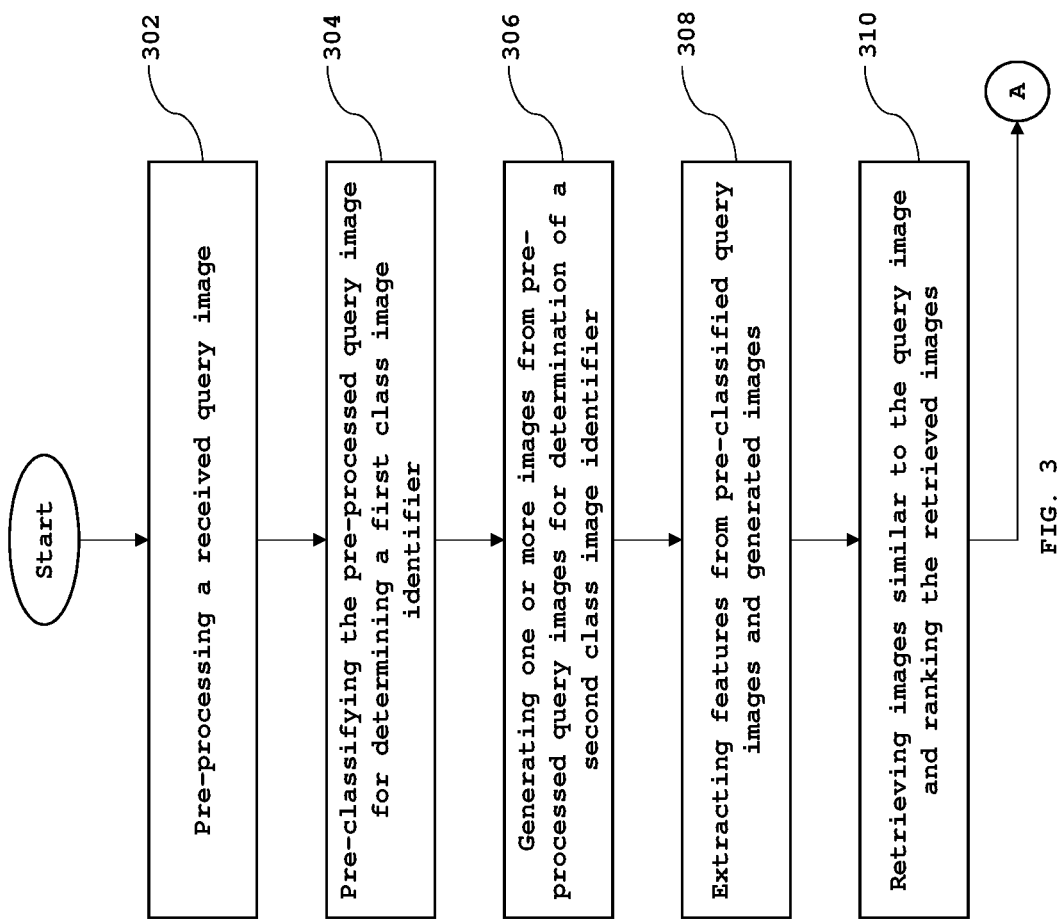
FIG. 3 is a flowchart illustrating a method for semantic level image retrieval, in accordance with various embodiments of the present invention.
Figure 3:
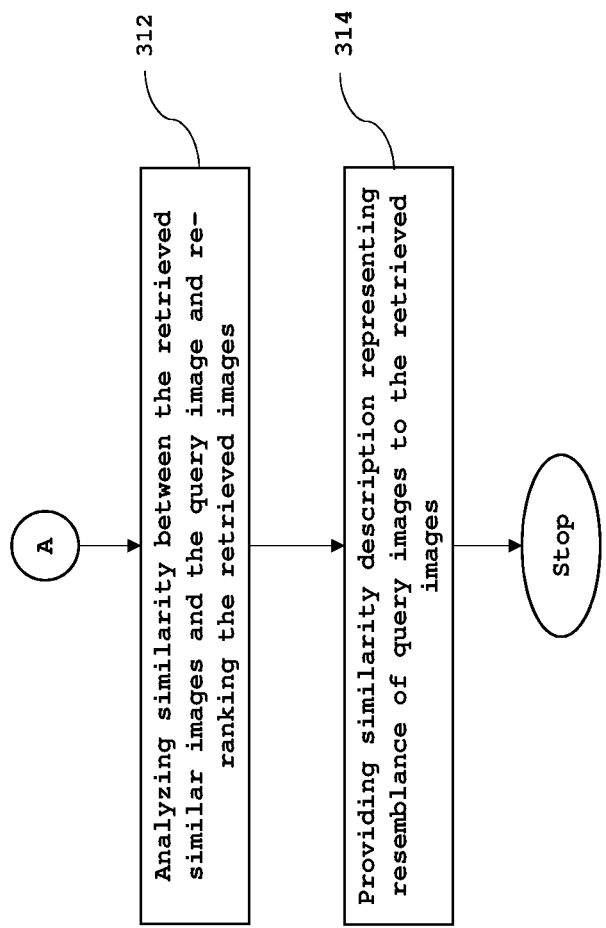

FIG. 3 is a flowchart illustrating a method for semantic level image retrieval, in accordance with various embodiments of the present invention.

At step 302, received query images are pre-processed. In an embodiment of the present invention, the query images received may be in a form which may include, but is not limited to, color, grayscale, sketch, document or the like. The received query images may be free from any unwanted defects or may contain some amount of defects such as, but are not limited to, noise, blur, illumination issues, camera distortions, motion distortions, occlusions, populated with objects or the like. Further, the type of noise present in the query images may include, but is not limited to, impulse noise, Gaussian noises, lens distortions, camera artifacts, motion blur or the like. Further, an appropriate filtering technique is applied depending upon the noise variance level present in the query images. The application of the appropriate filtration technique is carried out based on the noise variance ($\sigma$) estimation in accordance with a pre-set noise variance threshold value. In an exemplary embodiment of the present invention, the pre-set threshold value associated with noise variance ($\sigma$) is considered to be 50 and may vary depending upon noise removal requirements. The noise variance level is estimated by utilizing standard deviation methods on a patch of the query images. Further, the denoising techniques include an auto-encoder based denoising and a median filter based denoising. In an exemplary embodiment of the present invention, if the estimated noise variance is greater than the pre-set noise threshold value, denoising is carried out using the auto-encoder technique as the bias and mean squared error (MSE) may become difficult to compute and if the noise variance is less than the pre-set noise threshold value, denoising is carried out using the median filtering technique. Therefore, the appropriate filtration technique is switched for noise removal depending upon the estimated noise variance present in query images.

The query images are further processed for blur removal, if present after noise removal, before processing for illumination correction and enhancement. The output of only the median filtering technique is further processed for blur removal before processing for illumination correction and enhancement. Whereas, the output of the auto-encoder technique is directly processed for illumination correction and enhancement. The blur present in an image after denoising may be a motion blur or the like. The blur is first estimated using blur estimation techniques, such as, but are not limited to, steerable filter technique or the like. Further, the blur removal is carried out in accordance with a pre-set blur threshold value. If the estimated blur value is greater than the pre-set blur threshold value, than a blur removal technique such as, but is not limited to, Weiner deconvolution technique or the like is applied before illumination correction and enhancement. If the estimated motion blur is less than the pre-set blur threshold value than there is no requirement for blur removal and the output of median filter is processed for illumination correction and enhancement.

Further, the query images are pre-processed for illumination correction and enhancement after noise removal and blur removal. The illumination correction and enhancement are carried out by utilizing techniques such as, but are not limited to, morphological operations or the like. The query images are converted from RGB to L*a*b*. After the conversion from RGB to L*a*b*, the image is processed for brightness enhancement using techniques such as, but are not limited to, histogram equalizer on lightness (L) channel. Thereafter, image is converted back to RGB from L*a*b*. The processed image is thus uniformly illuminated and enhanced.

At step 304, the pre-processed query images are pre-classified for determining a class one image identifier. In an embodiment of the present invention, the pre-processed query images are classified based on the determined class one image identifier. The class one image identifier classifies the pre-processed query image into an image type and an application type. The class one image identifier determination for image classification is carried out by applying deep learning techniques or the like. In an exemplary embodiment of the present invention, firstly the pre-processed image is classified into the image type. The image type of the pre-processed image may include, but is not limited to, artistic, sketch, grayscale, color, document or the like. The image type of the pre-processed images is carried out by application of the auto-encoder techniques. After the application of the auto-encoder techniques, k-NN based classification technique is applied to further achieve accurate image classification for identifying the image types.

Further, simultaneously the pre-processed images are classified into an application type. The application type of the query image is a high level understanding of the domain to which an image may relate which may include, but is not limited to, apparel, fashion, medical diagnosis, person, scenery images, vehicle, retail catalogs, trademarks or the like.

In an exemplary embodiment of the present invention, the application type of the pre-processed images is identified based on three types of classification. The output of the three types of classification is combined together to identify the application type of a pre-processed image. The three type of classification includes firstly, cognitive technique based classification such as, deep learning based classification; secondly, text based classification; and lastly, computer vision based classification. The first type of classification relates to cognitive based classification using deep learning classification techniques, such as, neural network techniques which may include, but are not limited to, auto-encoder techniques, convolutional neural network (CNN) or the like. After the application of auto-encoder and CNN techniques, further classification is carried out using classification techniques which may include, but are not limited to, k-NN based classification. The second type of classification relates to text based classification techniques. Firstly, the text in an image is converted to machine readable format for identifying text in the pre-processed image by applying techniques which may include, but are not limited to, an optical character recognition (OCR) technique or the like. After OCR, a text classification is carried out by extracting term frequency-inverse document frequency (TFIDF). Thereafter, applying classification techniques for text classification such as, but are not limited to, a Naïve Bayes classifier or the like. Thereafter, the third type of classification is carried out which relates to computer vision based classification techniques. Firstly, the local features of the pre-processed images are extracted. The local feature extraction is carried out by utilizing techniques such as, but are not limited to, Harris corner detector technique (for key point detection), Oriented FAST and rotated BRIEF (ORB) techniques (for feature descriptor) or the like. Thereafter, another image classification technique is applied on the extracted local features such as, but not limited to, Bag of Visual Words (BOVW). A codebook is generated using k-means clustering technique by clustering similar feature vectors such that the similar feature vectors are placed close to each other as compared to other vectors. Subsequently, a Naïve Bayes classifier based classification technique is applied on the clustered similar feature vectors for classification of clustered images. Further, after classification of pre-processed images using the above elaborated three techniques, the output of the three types of classification applied are combined for identifying application type of the pre-processed image using machine learning based ensemble techniques, which may include, but are not limited to, stacking technique or the like. The confidence scores of all the three classification techniques are calculated and are aggregated to provide the application type of the pre-processed image.

At step 306, images are generated from the pre-processed query images for determination of a class two image identifier. In an embodiment of the present invention, the class two image identifier may relate to a different image types, a similar and a dissimilar image type generated from the pre-processed query images. The class two image identifier is determined for increasing variations of the pre-processed query image such that the image search and identification for image retrieval may be carried out effectively. Further, the system is trained by utilizing cognitive techniques such as, but are not limited to, machine learning techniques, deep learning techniques or the like. The machine learning based image generation techniques are used to train the system thereafter generate images. The machine learning techniques applied for image generation may include, but are not limited to, generative adversarial networks (GAN) techniques or the like. Further, the pre-processed image received may be a color image, sketch image, a grayscale image or a document image. The different types of GAN techniques are applied to generate images of different types, similar and dissimilar types.

Firstly, if a pre-processed image is a color image, it may be used to generate a different type of images (a sketch image, grayscale image or a text image), similar images and dissimilar images. The sketch image is generated from a color image using a domain transfer GAN technique which may include, but is not limited to, image to image translation GAN or the like. Grayscale image is generated from a color image by applying a grayscale conversion technique or the like. A similar image of a color image is generated by applying domain transfer GAN technique or the like. Therefore, a similar image is generated from a color image by translating the color image to another different image which is completely different from the said color image. For instance, image translation is performed by mapping objects of the said color image to another collection of objects thus rendering a completely different image. Further, the generated different image is translated to a new color image. The new color image is generated using domain transfer GAN technique which may include, but is not limited to, image to image translation GAN. Further, the differences between the first color image and the generated new color image are minimized by utilizing the trained CNN in a cyclic manner, such that the first color image and the generated new image have minimum differences with respect to each other and the first color image resembles the generated new color image. The dissimilar images are generated using a GAN technique, such as, but is not limited to, a cycle GAN technique of the like. Further, an image is generated in the form of a text by applying image captioning GAN technique. For example, if a pre-processed image is of a monument, then the image is generated in the form of text depicting the name of that monument by applying image captioning GAN or the like.

Secondly, if a pre-processed image is a grayscale image it is first converted to color image by application of colorization techniques or the like. In an exemplary embodiment of the present invention, the colorization is achieved by using a neural network built for this purpose. The neural network used may include, but is not limited to, a Convolutional Neural Network (CNN) or the like. Further, the color image generated from the grayscale image is converted to sketch image, similar and dissimilar images and image with caption. The sketch image is generated from a color image using a domain transfer GAN technique which may include, but is not limited to, image to image translation GAN or the like. A similar image of a color image is generated by applying domain transfer GAN technique or the like. Therefore, a similar image is generated from a color image by translating the color image to another different image which is completely different from the said color image. Further, the generated different image is translated back to the said color image which is a new color image. The new color image is generated using domain transfer GAN technique which may include, but is not limited to, image to image translation GAN. Further, the differences between the first color image and the generated new color image are managed by utilizing the trained CNN in cyclic manner, such that the first color image and the generated new image have minimum differences with respect to each other and the first color image resembles the generated new color image. The dissimilar images are generated using a GAN technique, such as, but is not limited to, a cycle GAN technique or the like. Further, an image is generated in the form of a text by applying image captioning GAN technique or the like.

Lastly, if a pre-processed image is a sketch image, it is first converted to color image by application of image to image translation GAN or the like. Further, the color image generated from the sketch image is converted to gray scale image, similar and dissimilar images and image with caption. The grayscale image is generated from the color image by applying a grayscale conversion technique or the like. A similar image of a color image is generated by applying domain transfer GAN technique or the like. Therefore, a similar image is generated from a color image by translating the color image to another different image which is completely different from the said color image. Further, the generated different image is translated back to the said color image which is a new color image. The new color image is generated using domain transfer GAN technique which may include, but is not limited to, image to image translation GAN. Further, the differences between the first color image and the generated new color image are minimized by utilizing the trained CNN in cyclic manner, such that the first color image and the generated new image have minimum differences with respect to each other and the first color image resembles the generated new color image. The dissimilar images are generated using a GAN technique, such as, but is not limited to, a domain transfer cycle GAN technique or the like. Further, an image is generated in the form of a text by applying image captioning GAN technique or the like.

At step 308, features are extracted from the pre-classified query images and generated images. In an embodiment of the present invention, the image features are selected and extracted based on the class one image identifier and the class two image identifier received. The features are extracted using three methods which may include, firstly, image centric feature extraction; secondly, object centric feature extraction; and lastly, application specific feature extraction. In an exemplary embodiment of the present invention, the output of the generated images comprising the generated grayscale images, sketch images, similar and dissimilar images are subjected to image centric feature extraction. Further, a color image is subjected to object centric feature extraction. For instance, object centric feature are extracted using color image (RGB format (3 channel)). Query image which are gray (1 channel) or are sketch image (1 channel) may not be appropriate for object centric features extraction. Therefore, the query image is transformed to color image using the image generation unit 212. Further, similar and dissimilar color images are generated to maximize variations of color images for easily identifying similar images and not omitting any image from the image database 206 having variations with respect to the color image. Furthermore, the image type and application type of a pre-processed image and the extracted text is subjected to application specific feature extraction. Furthermore, the output containing the image type and application type of a pre-processed image and the extracted text is subjected to application specific feature extraction.

The image centric features extraction techniques applied for feature extraction from the generated grayscale images, sketch images, similar and dissimilar images may include, local features extraction, global features extraction, CNN technique based feature extraction and auto-encoder technique based feature extraction. In an exemplary embodiment of the present invention, the local feature extraction is carried out based on local feature extraction techniques which may include, but are not limited to, Harris corner detector technique (for key point detection), Oriented FAST and rotated BRIEF (ORB) techniques or the like. Further, the global feature extraction is carried out based on global feature extraction techniques which may include, but are not limited to, joint color descriptor (JCD) or the like. Furthermore, the CNN technique based feature extraction is carried out using weights of a pre-trained CNN. Yet further, the auto-encoder technique based feature extraction is carried out by a pre-trained auto-encoder network. The image centric features extracted may include original image features, grayscale image features, similar image features, dissimilar image features and sketch image features.

In another embodiment of the present invention, the object centric features extraction techniques applied for features extraction from the received generated color image may include, visual saliency techniques, shallow level object detection techniques and image segmentation techniques.

In an exemplary embodiment of the present invention, the object centric features extraction provides a semantic level understanding of the images for extraction of similar images. Firstly, the object present in an image is selected for feature extraction. Large number of objects may be present in an image, the objects present in an image are identified and categorized i.e. narrowed down in a hierarchical manner using the visual saliency technique for selecting objects. The objects are selected based on identifying regions of interest for extracting deeper level of object features. The hierarchical manner of object detection is carried out for improving scalability of object detection when large number of objects exists in the received pre-classified images and generated color images. The hierarchical manner of object detection, in an image, ranges from shallow (high level) level category to deeper level category. The hierarchical manner of object detection is carried out if large number of similar images which are to be retrieved exists and a feedback is to be provided for efficient image feature extraction. For example, the shallow level of an object present in an image may be a vehicle, person, furniture, animal, plant, etc. The deeper level understanding of an object in an image if a vehicle may be a bus, car, bike, etc. Further, deeper level understanding of an object in an image suppose a car may be hatchback, sedan, SUV, luxury car, etc. Further, deeper level understanding of an object in an image suppose a hatchback car may be brand type, cost and so on. Therefore, a hierarchical level of object identification and selection is carried by using the visual saliency technique. The visual saliency technique applied uses machine learning techniques which may include, but are not limited to, CNN or the like. For example, if a large number of similar images exist which are to be retrieved, then the visual saliency techniques are applied on the pre-processed and generated image for extracting and ranking of similar objects present in these images based on similarity with the query images. The visual saliency technique scans relevant objects present in the image for narrowing down the images. Further, the features of object are ranked based on their similarity with the query image and based on the ranking the retrieved images are ordered. Secondly, after object selection, further deeper level of object detection is carried out using techniques such as, but are not limited, fine-grained object detection technique or the like. Thereafter, object features are extracted from region of interest of object.

In another exemplary embodiment of the present invention, after deeper level of object feature extraction using visual saliency technique, the shallow level object detection techniques are applied for shallow level objection detection of a color image. The shallow level of object detection is carried out using a machine learning technique, which may include, but is not limited to, mask region-CNN (RCNN) or the like. Object are selected at a shallow level and features of object at shallow level are extracted. In yet another exemplary embodiment of the present invention, the image may be segmented using image segmentation techniques. A particular region of interest may be segmented from other objects present in a color image. The segmentation technique applied may be a machine learning technique, which may include, but is not limited to, mask region-CNN (RCNN) or the like. After image segmentation, the segmentation features are extracted from the region of interest of segmented color image. Therefore, the object centric features extracted may be classified as fine-grained object features, shallow object features and segmentation features.

In yet embodiment of the present invention, the application specific feature extraction techniques applied for features extraction from the received image type, application type and extracted text may include, application specific feature extraction techniques or the like. For example, if an application relates to retail, then brand name and logo is extracted as application specific features. Further, various other use cases may be provided. The application specific features may further be classified as text specific features. The application features are determined depending upon the use cases by utilizing a pre-classified application type. For example, if a pre-classified image is classified as a product catalog, then product text attributes and logo features are extracted or if a pre-classified image is classified as a fashion apparel image then, gender, wearing types and logo features are extracted etc. In an exemplary embodiment of the present invention, CNN based feature extraction models are trained and are used for extracting features. In another exemplary embodiment of the present invention, pre-trained weightages which are built for a particular application are used for extracting features.

At step 310, images similar to the query image are retrieved and the retrieved images are ranked. In an embodiment of the present invention, firstly, extracted features of the pre-classified query images and generated images are analyzed with the stored images features for similar image retrieval. Secondly, a similarity analysis is performed between the received query image and the retrieved similar image and provided as feedback for feature extraction. Lastly, a similarity description is provided representing the resemblance of the query images with the retrieved similar images.

In an embodiment of the present invention, the features of the extracted features pre-classified query image and generated images are analyzed. The features of the analyzed extracted features of the pre-classified query images and generated images may be categorized as, but are not limited to, image type features, generated image features, image object features, application type features. The extracted pre-classified query image features and generated images features are analyzed with respect to the stored image features of the stored images by invoking the feature database to retrieve the indexed features. Thereafter, the extracted features of the pre-classified query image and the generated images are matched with the received features from the feature database. After feature matching, the image database is invoked for retrieving the images having similar features with respect to the extracted features of the pre-classified query images and generated images. Thereafter, the first category of images retrieved is a list of most similar 'N' images from the image database based on their feature resemblance after the feature match with the extracted features of the pre-classified query images and generated images. For example, if the received query image is a color image, the images collected and retrieved may include, a color image, a sketch image, a grayscale image or the like. Similarly, the second category of images retrieved is a list of most similar 'N' images from the image database based on their resemblance with the generated similar and dissimilar images. Further, the third category of images retrieved is a list of most similar 'N' images based on resemblance of the objects features extracted from the pre-processed query images and generated images and the retrieved similar image. The forth category of images retrieved is a list of most similar 'N' images based on application specific features and text features present in the pre-classified query image and generated images and the retrieved similar image.

Further, after the retrieval of images a weighted term frequency is calculated to check the number of times an image has appeared across all retrieved similar images for providing the most similar image. A weighted term frequency is calculated for list of images retrieved based on similar image features and generated images category. Further, a weighted term frequency is calculated for list of images retrieved based on their object features. For example, the object features could be fine-grained, shallow and segmentation features. Therefore, higher weights are given to fine-grained object features. However, a weighted inverse term frequency is calculated for list of images retrieved based on application specific and text features. If higher weights similarity scores are provided to an image, that image is determined and ranked as most similar to the query image and is therefore, selected for further analysis.

At step 312, similarity between the retrieved similar images and the query image is analyzed and the retrieved images are re-ranked. In an embodiment of the present invention, after feature analysis and retrieving the most similar image, the similar images i.e. the query image and the retrieved similar images are analyzed with respect to each other in conjunction with the feature database. The analysis is performed for assessing similarity between images and their features. Further, at least three specific functions are performed for assessing the similarity between images. The three functions may include, firstly, determining similarity of a retrieved image with respect to the query image; and secondly, reordering of similar images based on their similarity with the query image; and lastly, providing feedback of similarity analysis for appropriate image feature extraction by using fine-grained features, if large number of similar images which are to be retrieved exists.

The analysis of determination of similarity of a retrieved image with respect to the query image is performed in conjunction with the feature database. The analysis is performed with respect to various parameters which may include, but are not limited to, an image type analysis, a photometric analysis, an object analysis, a noise analysis, a text analysis, an application type analysis. The analysis parameters may be utilized for the image analysis. In operation, firstly, the image type analysis with respect to the similarity between the query image and selected similar image from the image database is analyzed in conjunction with the features stored in the feature database. Secondly, the photometric analysis is performed wherein variation due to brightness and contrast changes are calibrated between images. In an exemplary embodiment of the present invention, the lightness (L) channel of L*a*b* color technique is utilized for brightness and contrast calibration. Thirdly, the geometric analysis is performed for determining affine transformation between images. In an exemplary embodiment of the present invention, the affine transformation analysis determines changes in rotation, translation and scale between images. Fourthly, the object level analysis is performed for similarity analysis at object level. In an exemplary embodiments of the present invention, the features extracted for each object in an image are accumulated and compared against those stored and indexed in the feature database. Further, the photometric analysis and geometric analysis may be performed at object level as well. Lastly, the noise analysis is performed based on noise distribution in the images. In an exemplary embodiment of the present invention, noise due to obstruction and occlusions may be determined based on number of key points of the image which are desired to be seen the similar images are retrieved and based on the number the level of occlusion noise can be estimated.

Further, after analysis of images, the retrieved similar images are ranked based on their similarity with the query image. In an exemplary embodiment of the present invention, the distance measurements techniques such as, but not limited to, Hamming, Euclidean and Earth movers distance or the like may be utilized for similarity analysis of retrieved similar images with the query image using a threshold value. Based on the ranks provided, the retrieved similar images are re-ranked and ordered with respect to their resemblance with the query image. Further, in yet another embodiment of the present invention, after similarity analysis, the similarity may be high provided the level of features extracted. Therefore, to extracted finer features a feedback of similarity is provided for reducing similarities. For example, feedback is provided for fine-grained feature extraction by utilizing visual saliency and shallow level features. Further, the techniques are utilized to narrow down the images from the similar images obtained initially.

At step 314, similarity description representing resemblance of query images to the retrieved images is provided. In an embodiment of the present invention, after feature analysis and similarity analysis, a similarity description is provided with regard to the resemblance of the query image to the retrieved similar images from the image database. In an exemplary embodiment of the present invention, the similarity description may provide information, but is not limited to, as to whether the desired content is present, desired object is present or desired object is not present or the like. Further, with respect to an object in an image, the description may mention difference of the object in the retrieved images from the image database. For example, the description may state that a certain object translated by a displacement while at the same time it is rotated by a definite angle. In an exemplary embodiment of the present invention, various techniques are utilized for comparing the query images and the retrieved images to provide the similarity description. The image type analysis is performed to determine whether the retrieved images are color, grayscale or sketch images. Further, variations in brightness and intensity are determined using photometric analysis involving the lightness (L) channel of L*a*b color space. Further, geometric analysis is carried out to compare affine related changes between the query images and the retrieved images. Further, variations in scale, translation and rotation may be measured. Further, noise analysis is carried out to estimate difference of noise present between query images and retrieved images. Further, the object level analysis is performed by utilizing feature key points which compares similar objects between images. Furthermore, text analysis may be performed using TF-IDF and OCR to compare similar textual information if present in the query and retrieved images. Furthermore, the retrieved images may be analyzed for detecting similar application as compared to the query image. Therefore, the similarity description is provided after analysis of query images and retrieved images. Further, the similarity description is generated in the form of a text which explains similarity of the retrieved images with respect to the query images. The text generation is carried out by utilizing a natural language processing (NLP) technique or the like, which compares the features between retrieved and query image and formalizes the comparison into a readable text.

FIG. 4 illustrates an exemplary computer system in which various embodiments of the present invention may be implemented. The computer system 402 comprises a processor 404 and a memory 406. The processor 404 executes program instructions and is a real processor. The computer system 402 is not intended to suggest any limitation as to scope of use or functionality of described embodiments. For example, the computer system 402 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 406 may store software for implementing various embodiments of the present invention. The computer system 402 may have additional components. For example, the computer system 402 includes communication channels 408, input devices 410, output devices 412, and storage 414. An interconnection mechanism (not shown) such as a bus, controller, or network, interconnects the components of the computer system 402. In various embodiments of the present invention, operating system software (not shown) provides an operating environment for various software's executing in the computer system 402, and manages different functionalities of the components of the computer system 402.

The communication channel(s) 408 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 410 may include, but not limited to, a keyboard, mouse, pen, joystick, trackball, a voice device, a scanning device, touch screen or any another device that is capable of providing input to the computer system 402. In an embodiment of the present invention, the input device(s) 410 may be a sound card or similar device that accepts audio input in analog or digital form. The output device(s) 412 may include, but not limited to, a user interface on CRT or LCD, printer, speaker, CD/DVD writer, or any other device that provides output from the computer system 402.

The storage 414 may include, but not limited to, magnetic disks, magnetic tapes, CD-ROMs, CD-RWs, DVDs, flash drives or any other medium which can be used to store information and can be accessed by the computer system 402. In various embodiments of the present invention, the storage 414 contains program instructions for implementing the described embodiments.

The present invention may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for retrieval of similar images related to query images, wherein the method is implemented by a processor executing instructions stored in a memory, the method comprising:
   pre-processing the query images for noise removal by selecting a filtering technique for each query image based on a noise variance estimation in each of the query images with respect to a pre-set noise variance threshold value;
   pre-classifying the pre-processed query images for determining a class one image identifier;

generating one or more image types from the pre-processed query images for determining a class two image identifier;

extracting features from the pre-classified query images based on the class one image identifier and from the generated images based on the class two image identifier;

retrieving one or more images similar to the query images, wherein the retrieved similar images have features similar to the extracted features of the pre-classified query images and the generated images;

ranking the retrieved similar images for determining the most similar images with respect to the query images; and analyzing similarity between the query images and the retrieved similar images, wherein based on the analysis the retrieved similar images are re-ranked.

2. The method as claimed in claim 1, wherein the selected filtering technique for noise removal from the query images comprises an auto-encoder filtering technique and a median filtering technique, wherein the auto-encoder filtering technique is selected if the estimated noise variance in the query image is greater than the pre-set noise variance threshold and the median filtering technique is selected if the estimated noise variance in the query image is less than the pre-set noise variance threshold.

3. The method as claimed in claim 1, wherein the step of pre-processing comprises estimating a blur value, wherein if the estimated blur value is greater than a pre-set blur threshold value the query image is pre-processed for blur removal after noise removal.

4. The method as claimed in claim 1, wherein the determined class one image identifier pre-classifies the pre-processed query images into an image type and an application type, wherein the image type identifies the type of the pre-processed query images and application type identifies the domain of the pre-processed query images.

5. The method as claimed in claim 4, wherein the image type pre-classification of the pre-processed query image is carried out by application of an auto-encoder technique and a subsequent application of k-NN classification technique.

6. The method as claimed in claim 4, wherein the application type pre-classification for identifying domain of the pre-processed query images comprises:
a deep learning classification, wherein the deep learning classification is carried out by applying an auto-encoder technique and a convolutional neural network technique (CNN) and a subsequent application of a k-NN classification technique;
a text classification, wherein the text classification is carried out by applying an optical character recognition (OCR) technique for identifying text in the pre-processed query image and a subsequent extraction of a term frequency-inverse document frequency (TFIDF) and followed by classification utilizing a Naïve Bayes classifier technique;
a computer vision based classification for local feature extraction, wherein the computer vision based classification is carried out by applying a Harris corner detector for key point detection and a Oriented FAST and rotated BRIEF (ORB) techniques for image feature descriptor and a subsequent application of a Bag of Visual Words (BOVW) technique for generating a codebook utilizing k-means clustering technique for clustering similar feature vectors as compared to other vectors followed by applying a Naïve Bayes classifier; and combining the output of the first, second and third classification steps by utilizing an ensemble technique and subsequently calculating and aggregating a confidence score of the first, second and third classification.

7. The method as claimed in claim 1, wherein the determined class two image identifier includes one or more different image types, one or more similar image types and one or more dissimilar image types generated from the pre-processed query images.

8. The method as claimed in claim 7, wherein the pre-processed query images utilized for generating the different image type, the similar image type and the dissimilar image type comprises a color image, a grayscale image, a sketch image and a document image.

9. The method as claimed in claim 7, wherein the generated different image type comprises a sketch image, a grayscale image and a text image if the pre-processed query image is a color image.

10. The method as claimed in claim 7, wherein the pre-processed query image is converted to a color image before generating the different image type if the pre-processed query image is a grayscale image, wherein the generated different image type comprises a sketch image and a text image.

11. The method as claimed in claim 7, wherein the pre-processed image is converted to a color image before generating the different image type if the pre-processed query image is a sketch image, wherein the generated different image type comprises a grayscale image and a text image.

12. The method as claimed in claim 1, wherein the features from the pre-classified images and the generated images are extracted utilizing an image centric feature extraction, an object feature extraction and an application specific feature extraction.

13. The method as claimed in claim 12, wherein the image centric feature extraction is applied on the generated images if the generated image is a grayscale image, a sketch image, similar image and dissimilar image and wherein the image features are extracted from the generated images utilizing a local feature extraction technique, global feature extraction technique, a convolutional neural network technique and an auto-encoder technique.

14. The method as claimed in claim 12, wherein the object feature extraction is applied on the generated images other than the generated images on which the image feature extraction is applied if the generated image is a color image and wherein the object feature extraction is carried out by hierarchical extraction of features of the objects in the image from a shallow level to a deeper level of object feature extraction.

15. The method as claimed in claim 12, wherein the application specific feature extraction is applied for feature extraction from the pre-classified image type, application type and text in an image.

16. The method as claimed in claim 1, wherein the features extracted from the pre-classified images and the generated images are analyzed with respect to the features of images which are to be retrieved before retrieval of similar images.

17. The method as claimed in claim 1, wherein the similar image types retrieved are categorized as (a) images having feature resemblance with the extracted features of the pre-processed query images and the generated images, (b) images having resemblance with the generated similar and dissimilar images, (c) images having resemblance with the object features extracted from the pre-processed query images and the generated images, and (d) images having resemblance with the application specific features and text features present in the pre-classified query images and generated images.

18. The method as claimed in claim 1, wherein the similarity analysis between the query image and the retrieved and ranked similar images is performed based on parameters which includes an image type analysis, a photometric analysis, an object analysis, a noise analysis, a text analysis and an application type analysis.

19. The method as claimed in claim 1, wherein a feedback of similarity analysis between the query image and the retrieved similar images is provided if multiple images which are to be retrieved similar to the query images exist.

20. The method as claimed in claim 1, wherein a description of similarity is provided with regard to the resemblance of the query image with the retrieved similar images.

21. A system for retrieval of similar images related to query images, the system comprising:
a memory storing program instructions;
a processor configured to execute program instructions stored in the memory; and
an image processing engine in communication with the processor and configured to:
pre-process the query images for noise removal by selecting a filtering technique for each query image based on a noise variance estimation in each of the query images with respect to a pre-set noise variance threshold value;
pre-classify the pre-processed query images for determining a class one image identifier;
generate one or more image types from the pre-processed query images for determining a class two image identifier;
extract features from the pre-classified query images based on the class one image identifier and from the generated images based on the class two image identifier;
retrieve one or more images similar to the query images, wherein the retrieved similar images have features similar to the extracted features of the pre-classified query images and the generated images;
rank the retrieved similar images for determining the most similar images with respect to the query images; and
analyze similarity between the query images and the retrieved similar images, wherein based on the analysis the retrieved similar images are re-ranked.

22. The system as claimed in claim 21, wherein the image processing engine comprises a pre-processing unit in communication with the processor, the pre-processing unit configured to switch either to an auto-encoder filtering technique or a median filtering technique for noise removal from the query images, wherein the pre-processing unit switches to the auto-encoder filtering technique if the estimated noise variance in the query image is greater than the pre-set noise variance threshold and the pre-processing unit switches to the median filtering technique if the estimated noise variance in the query image is less than the pre-set noise variance threshold.

23. The system as claimed in claim 21, wherein the image processing engine comprises a pre-classification unit in communication with the processor, the pre-classification unit configured to determine the class one image identifier and based on the determined class one image identifier pre-classify the pre-processed query images into an image type and an application type.

24. The system as claimed in claim 21, wherein the image processing engine comprises an image generation unit in communication with the processor, the image generation unit configured to determine the class two image identifier, wherein the determined class two image identifier includes one or more different image types, one or more similar image types and one or more dissimilar image types generated from the pre-processed query images.

25. The system as claimed in claim 21, wherein the image processing engine comprises a feature extraction unit in communication with the processor, the feature extraction unit configured to extract features from the pre-processed query images and the generated images utilizing an image centric feature extraction, an object feature extraction and an application specific feature extraction.

26. The system as claimed in claim 21, wherein the system comprises a similarity analyzer configured to analyze the features extracted from the pre-classified images and the generated images with respect to the features of images which are to be retrieved before retrieval of similar images.

27. The system as claimed in claim 26, wherein the similarity analyzer is configured to categorize the retrieved similar images as (a) images having feature resemblance with the extracted features of the pre-processed query images and the generated images, (b) images having resemblance with the generated similar and dissimilar images, (c) images having resemblance with the object features extracted from the pre-processed query images and the generated images, and (d) images having resemblance with the application specific features and text features present in the pre-classified query images and generated images.

28. The system as claimed in claim 26, wherein the similarity analyzer is configured to provide a feedback of similarity analysis between the query image and the retrieved similar images to the feature extraction unit if multiple images which are to be retrieved exist that are similar to the query images.

29. A computer program product comprising:
a non-transitory computer-readable medium having computer program code store thereon, the computer-readable program code comprising instructions that, when executed by a processor, caused the processor to:
pre-process the query images for noise removal by selecting a filtering technique for each query image based on a noise variance estimation in the query images with respect to a pre-set noise variance threshold value;
pre-classify the pre-processed query images for determining a class one image identifier;
generate one or more image types from the pre-processed query images for determining a class two image identifier;
extract features from the pre-classified query images based on the class one image identifier and from the generated images based on the class two image identifier;
retrieve one or more images similar to the query images, wherein the retrieved similar images have features similar to the extracted features of the pre-classified query images and the generated images;
rank the retrieved similar images for determining the most similar images with respect to the query images; and analyze similarity between the query images and the retrieved similar images, wherein based on the analysis the retrieved similar images are re-ranked.

* * * * *